Sept. 20, 1949.　　A. BOGROW ET AL　　2,482,574
REDUCTION OF VISCOSITY OF MOLTEN
SULFUR BY MEANS OF RESIN ACIDS
Filed Jan. 22, 1949
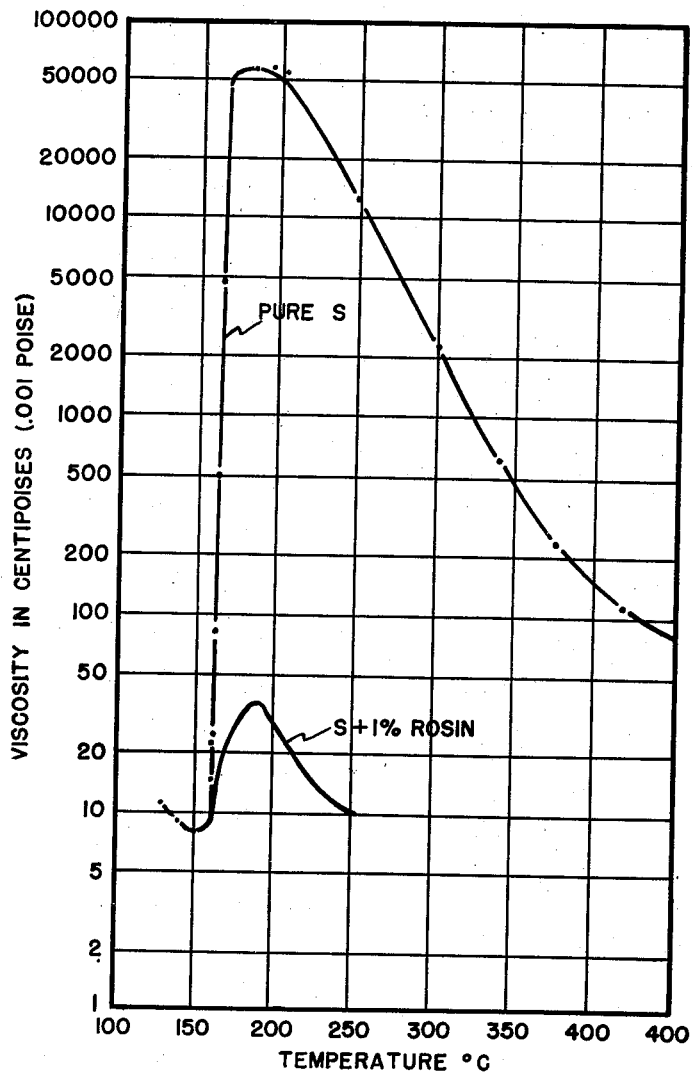
ALEXANDER BOGROW
ALFRED R. JOHNSON
　　　　　　　INVENTORS.
BY *Alfred R. Johnson*
ATTORNEY Patented Sept. 20, 1949

2,482,574

UNITED STATES PATENT OFFICE 2,482,574

REDUCTION OF VISCOSITY OF MOLTEN SULFUR BY MEANS OF RESIN ACIDS

Alexander Bogrow, Brighton, and Alfred R. Johnson, Stoneham, Mass., assignors to Arthur D. Little, Inc., Cambridge, Mass., a corporation of Massachusetts Application January 22, 1949, Serial No. 72,194

4 Claims. (Cl. 23—224)

This invention relates to the reduction of the maximum viscosity of molten sulfur, and more particularly to effecting such reduction by the addition of natural resin acids. This application is a continuation-in-part of our United States application Ser. No. 720,302 filed January 4, 1947.

Sulfur is a relatively cheap and plentiful material having many diverse uses. A well known characteristic of sulfur, however, which limits its use for some of the purposes to which it might be put, is the great increase in viscosity which takes place when molten sulfur is heated. As the temperature of liquid sulfur is raised above its melting point (about 120° C.) to temperatures beyond about 158° C., its viscosity increases precipitously to a maximum of about 53,000 centipoises at 186° C.–188° C. If the temperature is raised further, the viscosity of molten sulfur gradually decreases, until at 444.6° C., the boiling point at normal pressure, it is about 100 centipoises. Several materials are known which greatly modify the viscosity of molten sulfur when added in small quantities, such as halogens and certain sulfides. These known materials, however, are expensive, volatile (or gaseous), or more or less difficult to handle, or else they may not be suitable for some particular uses to which the molten sulfur may be put.

It is an object of this invention to so modify the viscosity of molten sulfur at temperatures of 158° C. and above, by the addition of small quantities of relatively inexpensive materials not having the disadvantages of presently known sulfur viscosity reducing agents, that molten sulfur at temperatures of 158° C. and above may be caused to flow readily, as by pumping. Other objects will appear hereinafter.

These objects are accomplished by the addition to sulfur of from 0.1 to 5% by weight of natural resin acids. The addition may be advantageously made by mixing the resin acids with solid sulfur, or with molten sulfur in its relatively fluid state—i. e. between 120° C. and about 158° C. The temperature of the sulfur is then raised through the critical temperature of about 158° C., whereupon the desired operations with the molten sulfur may be carried out at these elevated temperatures with facility. This ease of handling is due to the fact that the viscosity of such molten sulfur remains below 500 centipoises—and in many cases even below 100 centipoises—even at temperatures around 186–188° C. The sharp rise in viscosity at about 158° C., which is characteristic of ordinary sulfur, is therefore completely eliminated by the procedure of the present invention.

It has been found that the effect of a true sulfur viscosity reducing agent is so marked that when it is used in an amount of about 1% by weight, based on the weight of the sulfur, the maximum viscosity of molten sulfur is reduced in many cases from thousands of centipoises to less than 100 centipoises, and in any event, below 500 centipoises. If, however, a material is not a true sulfur viscosity reducing agent, amounts of it even in excess of 5% by weight on the sulfur have little or no influence on the viscosity of sulfur.

To illustrate the process and products of this invention, the following examples of the use of natural resin acids are given.

One of the cheapest and most easily available source of such acids is rosin. 1 part by weight of crude gum rosin was thoroughly mixed with 100 parts by weight of dry flowers of sulfur. The mixture was heated to over 300° C. At no point did the viscosity of the sulfur mixture rise above 100 centipoises. The results of this run are shown in the accompanying drawing, together with the viscosity curve for ordinary sulfur throughout its molten state. It will be noted that the rosin has no significant effect until the temperature of the molten sulfur exceeds the critical temperature of about 158° C.

The same procedure was followed substituting partially purified rosin for the crude rosin. As in the case of crude rosin, the viscosity did not rise above 100 centipoises at any temperature. In a repetition of the experiment, replacing the crude rosin first with water-white gum rosin, and then with commercial abietic acid, as the viscosity reducing materials, similar results were obtained. In all cases, upon heating the mixture to a temperature sufficient to cause a maximum viscosity increase with pure sulfur, the viscosity of the mixtures remained well below 100 centipoises.

Batches of 100 parts each of flowers of sulfur were then each mixed with 1 part of one or another grade of commercial tall oil containing between about 30% and 50% resin acids. The mixtures were heated to above 300° C. In each case the molten sulfur mixture remained very fluid at all temperatures and in no case did the viscosity rise above 500 centipoises. Substantially the same degree of viscosity reduction may be obtained using 1% of the resin acids recovered from tall oil.

One per cent by weight of gum copal was mixed with flowers of sulfur and heated to 250° C. The mixture at no time attained a viscosity in excess of 100 centipoises.

One and five per cent by weight of gum mastic were mixed with flowers of sulfur and heated to 250° C. The mixtures at no time attained a viscosity in excess of 100 centipoises.

One per cent by weight of shellac was mixed with flowers of sulfur and heated to 250° C. The mixture was more viscous than the previous mixtures, but when the shellac became dissolved, the viscosity was less than 500 centipoises at all temperatures when molten.

It is evident from the above examples that the natural resin acids used may be contained in a relatively purified grade of rosin, e. g. the WW grade, or in a relatively impure rosin, e. g. the F or FF grade, or else they may be present as a substantial constituent of rosin-containing or resin-containing materials, such as tall oil or such natural resin-acid containing materials as copal, mastic, and shellac.

Further investigation of the effect of crude rosin on the viscosity of sulfur at about 187° C. showed that, even in very small amounts, it caused a considerable depression of the viscosity. Even as little as 0.1% of crude rosin served to depress the viscosity of sulfur at a temperature of 187° C. to below 500 centipoises.

It was found on the other hand that quantities in excess of 5% of any of the resin-acid containing materials described above offered no advantage over the quantities shown in the examples— i. e. 5% or less.

The advantages in reducing the viscosity of sulfur so that it may be used, for example, as a heat transfer agent, are apparent. Also, in the manufacture of carbon bisulfide, low-viscosity molten sulfur is of great advantage as shown in the copending application Ser. No. 597,823 of Leroy F. Marek, now U. S. Patent 2,424,894.

The above descriptions and examples are intended to be illustrative only. Any modifications thereof, or variations therefrom, which conform to the spirit of this invention are deemed within the scope of the appended claims.

We claim:

1. The process of reducing the viscosity of sulfur in the temperature range of 158° C. to 444° C., which consists in forming a sulfur mixture by adding to said sulfur, resin acids in an amount of from 0.1 to 5% of the weight of the sulfur, and heating the sulfur mixture to a temperature between about 158° C. and 444° C., said sulfur mixture having a viscosity of less than 500 centipoises at all temperatures when molten.

2. The process in accordance with claim 1 wherein the natural resin acid is rosin.

3. The process in accordance with claim 1 wherein the resin acid is tall oil.

4. The process in accordance with claim 1 wherein the resin acid is shellac.

ALEXANDER BOGROW.
ALFRED R. JOHNSON.

No references cited.